No. 755,711. PATENTED MAR. 29, 1904.
W. H. SEWELL.
TIRE FOR VEHICLES.
APPLICATION FILED MAR. 24, 1903.
NO MODEL. 2 SHEETS—SHEET 1.
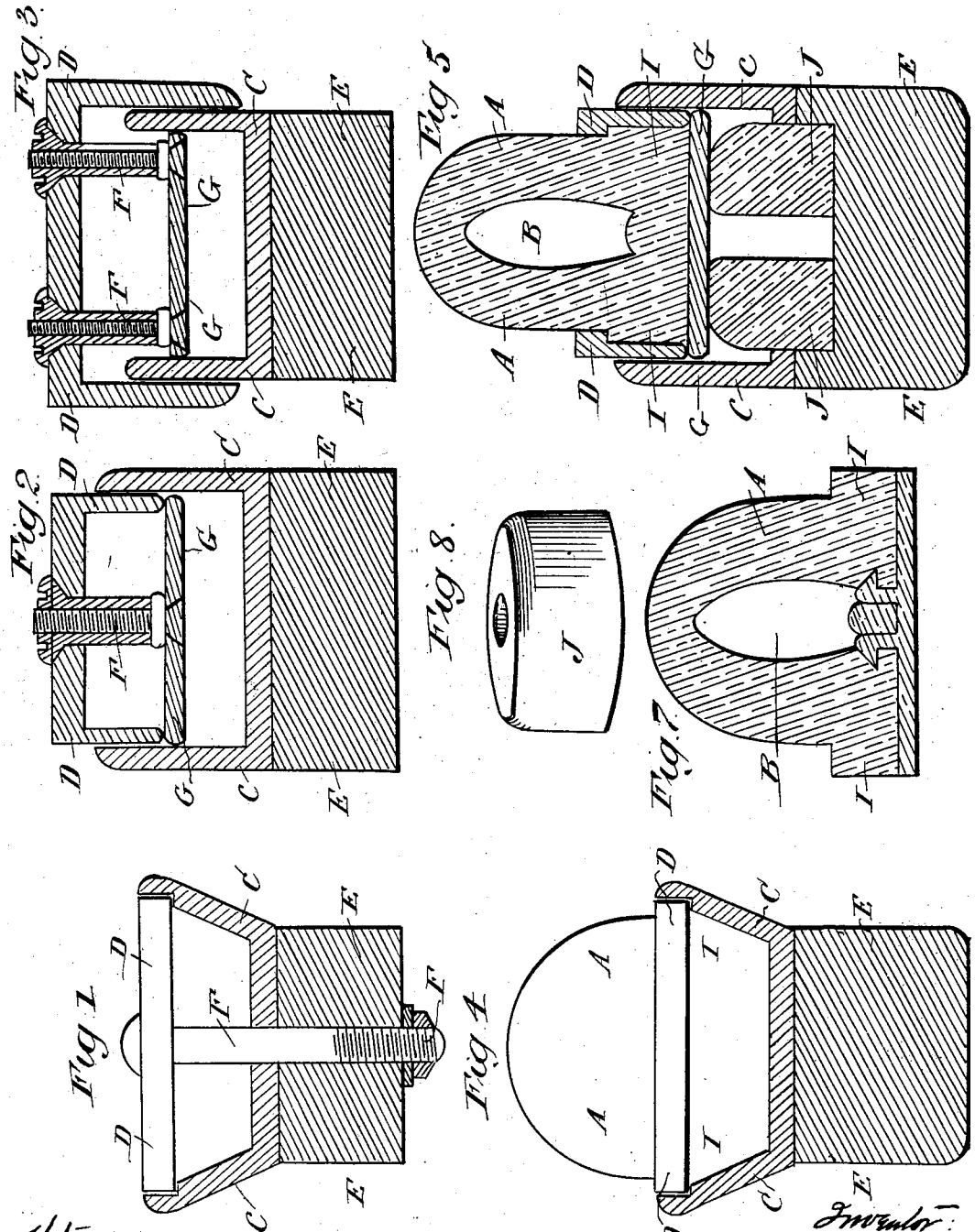

No. 755,711. PATENTED MAR. 29, 1904.
W. H. SEWELL.
TIRE FOR VEHICLES.
APPLICATION FILED MAR. 24, 1903.
NO MODEL. 2 SHEETS—SHEET 2.
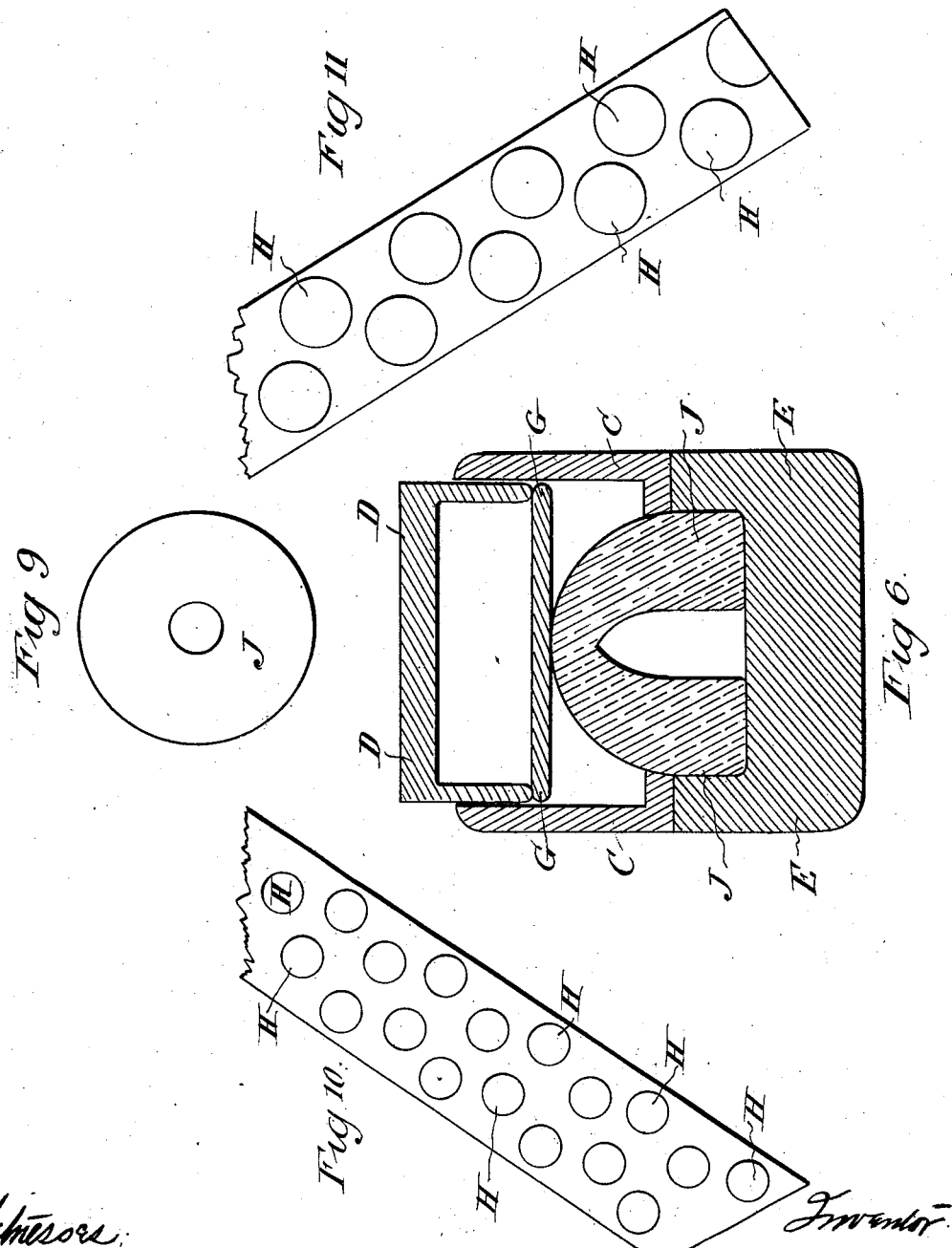

No. 755,711.

Patented March 29, 1904.

UNITED STATES PATENT OFFICE.

WILLIAM HERBERT SEWELL, OF BELFAST, IRELAND.

TIRE FOR VEHICLES.

SPECIFICATION forming part of Letters Patent No. 755,711, dated March 29, 1904.

Application filed March 24, 1903. Serial No. 149,291. (No model.)

*To all whom it may concern:*

Be it known that I, WILLIAM HERBERT SEWELL, merchant, of 85 Victoria street, Belfast, Ireland, have invented certain new and useful Improvements in and Connected with Tires for Vehicles, of which the following is a specification.

This invention relates to improvements in and connected with vibration and noise absorbing tires for horse and motor vehicles, cycles, &c., and is a development of my prior patents, No. 603,710, and dated May 10, 1898; No. 598,443, and dated February 1, 1898; No. 609,839, and dated August 30, 1898; No. 620,507, and dated February 28, 1899; No. 648,802, and dated May 1, 1900; No. 685,180, and dated October 22, 1901; and it consists in a somewhat differing form of rubber tread-segment, a differing rim, and method of attachment of the tire on the rim and to the wheel, also an improved and more certain and efficacious method of taking up or absorbing vibration and obviating skid or side slip.

In order that my invention may be properly understood and readily carried into effect, I hereunto append two sheets of drawings illustrative of same, of which—

Figure 1 is a section of rim attached to wheel-felly. Figs. 2 and 3 are sections of different forms of rim attached to wheel-felly. Fig. 4 is a part section and part elevation of rim, Fig. 1, showing rubber ball or segment in position. Fig. 5 is a part section and part elevation of rim, Fig. 2 or 3, with rubber ball or segment in position and backed by a rubber buffer or cushion. Fig. 6 is a part section and part elevation of rim, Fig. 2 or 3, with a modified form of buffer or cushion. Fig. 7 is a section showing my improved ball or tread-segment. Fig. 8 is a side elevation of rubber buffer or cushion J shown in Fig. 6. Fig. 9 is a face plan of buffer J, Fig. 6. Figs. 10 and 11 show differing forms of plan of rim-face.

In carrying out my present invention I provide my usual form of tire-tread—viz., a series of independent balls, sections, or segments A, Fig. 7—composed of rubber or a like compressible material, the only difference between same and the segments claimed and described in my prior patents being that I now form the interior hollow or air-chamber B, Fig. 7, of cigar or torpedo shape, so that strain or pressure will be more perpendicularly communicated to the wall of the ball or segment, and consequently more resistance be offered to depression.

Referring to the rim and the method of attaching my compressible tire thereto, I will use an inner and an outer rim C and D, respectively, of steel or other suitable material, the former, C, being concave and continuous and shrunk circumferentially around the wheel-fellies E in the usual way, while the latter, D, will be in suitable lengths or sections fitting either on top of, within, or over the former or shrunk on rim C and rigidly attached thereto, as in Fig. 1, by bolt and nut attachment F or by its being held in position by being bolted to a base band or plate G, lying circumferentially within the channel of rim C and of a suitably smaller diameter and circumference than same—viz., rim C. This latter form of rim is shown in Figs. 2, 3, 5, and 6. Through suitable holes or openings H, Figs. 10 and 11, in the face of the outer rim D the domes of the compressible balls or segments will protrude to form the running face or tread of my tire, while the tangential bases I, Fig. 7, of the segments are retained between rims C and D, as in Figs. 1 and 4, or between base-plate G and rim D, as in Figs. 2, 3, 5, and 6. Figs. 2, 3, and 6 illustrate the rims with balls or segments removed. Rims as shown in Figs. 2, 3, 5, and 6 I propose as more particularly for use in motor-cars, the mechanism and machinery of which are sensitive and easily disarranged by vibration. I therefore propose to more thoroughly take up and prevent vibration from being communicated to the machine or vehicle by a buffer or cushion, Figs. 8 and 9, interposing between base-plate G of outer rim D and channel-bottom of rim C, or I may make suitable openings in channel-bottom of rim C, so as to permit of the buffer resting on or against the wooden felly of wheel, as shown at J in Figs. 5 and 6. These buffers or cushions may be composed of rubber or the like compressible and absorbent material, may be hollow or solid, and may be of a variety of shapes—such as circular, disks, spherical or semispherical balls or knobs—or I might use a series of steel springs. I might also find it advantageous to use a flat or corrugated band of rubber to be circumferentially in channel-bottom of rim C, or any of which forms the base-plate G of D rim would be free to cushion itself and spend vibration or concussion.

My prior patents, to which I have drawn attention, provide for the balls or segments in the ground-tread of my wheel being placed intermittently, but in one parallel line. I now propose having them zigzag or other such fashion, as shown in the face plan of rim, Figs. 10 and 11, as well as parallel, as this will more effectually prevent skid or side slip, which are at present a pressing source of danger to motor-cars and their occupants.

Having described my invention, what I claim is—

1. In a vehicle-tire, the combination of a felly, a channel-shaped metal rim rigidly secured to said felly, a metal rim interposed between the sides of said channel-shaped rim, having openings, and segments or balls protruding through said openings, having elongated bases so shaped as to lie securely within the channel of the channel-shaped rim.

2. In a vehicle-tire, the combination of a felly, a channel-shaped metal rim rigidly secured to said felly, a metal rim interposed between the sides of said channel-shaped rim, having openings, pneumatic segments or balls protruding through said openings, the hollow space of said segments or balls being cigar-shaped, and elongated bases to said segments or balls, so shaped as to lie securely within the channel of the channel-shaped rim.

3. In a vehicle-tire, the combination of a felly, a channel-shaped metal rim rigidly secured to said felly, an outer metal rim interposed between the sides of said channel-shaped rim, having openings, a plate lying between said rims, dividing the channel circumferentially, means for securing said plate to the outer rim, segments or balls protruding through the openings of the outer rim and having elongated bases lying securely within the part of the channel between said outer rim and said plate, and resilient means interposed between said plate and the bottom of the channel.

4. In a vehicle-tire, the combination of a felly, a channel-shaped metal rim rigidly secured to said felly, an outer metal rim interposed between the sides of said channel-shaped rim, having openings, a plate lying between said rims, dividing the channel circumferentially, means for securing said plate to the outer rim, pneumatic segments or balls protruding through said openings, the hollow space of said segments or balls being cigar-shaped, elongated bases to said segments lying securely within the part of the channel between said outer rim and said plate, and resilient means interposed between said plate and the bottom of the channel.

5. In a vehicle-tire, the combination of a felly, a channel-shaped metal rim rigidly connected with said felly, an inverted channel-shaped rim closing the channel of first rim and having openings in the top plate, a plate in the channel dividing the same circumferentially, means for securing said plate to the inverted rim, segments or balls protruding through the top-plate openings in the inverted rim and having elongated bases lying securely in the outer space of the channel, and resilient means between said dividing-plate and the bottom of the channel.

6. In a vehicle-tire, the combination of a felly, a channel-shaped metal rim rigidly connected with said felly, an inverted channel-shaped metal rim closing the channel of first rim, having openings in the top plate, a plate in the channel dividing the same circumferentially, means for securing said plate to the inverted rim, pneumatic segments or balls protruding through the top-plate openings in said inverted rim, the hollow space of said segments or balls being cigar-shaped, elongated bases to said segments or balls lying securely in the outer space of the channel, and resilient means between said dividing-plate and the bottom of the channel.

7. In a vehicle-tire, the combination of a felly, a channel-shaped metal rim rigidly connected with said felly, an inverted channel-shaped metal rim closing the channel of first rim and having openings arranged in zigzag in the top plate, a plate in the channel dividing the same circumferentially, means for securing said plate to the inverted rim, pneumatic segments or balls protruding through the top-plate openings in said inverted rim, the hollow space of said segments or balls being cigar-shaped, elongated bases to said segments or balls lying securely in the outer space of the channel, and resilient means between said dividing-plate and the bottom of the channel.

In testimony whereof I have hereunto affixed my signature.

WILLIAM HERBERT SEWELL.

In presence of—
JOHN LIDDLE,
AGNES MACKINTOSH.